Oct. 30, 1934.                C. R. RANNEY                1,979,079
                             SORTING APPARATUS
                           Filed June 20, 1931          6 Sheets-Sheet 6
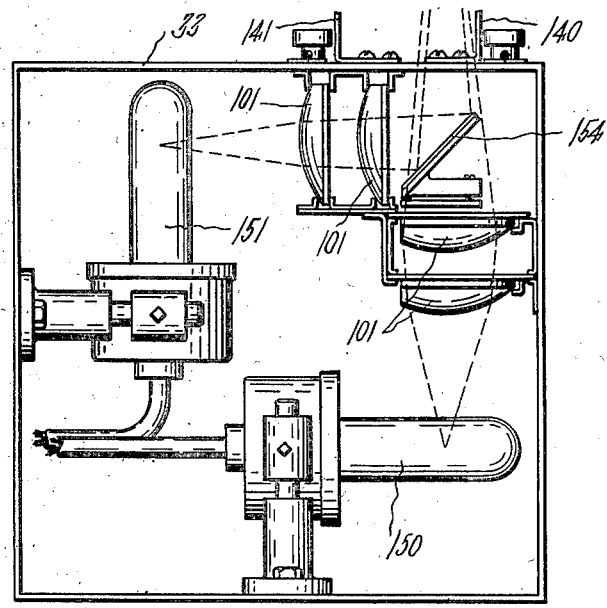
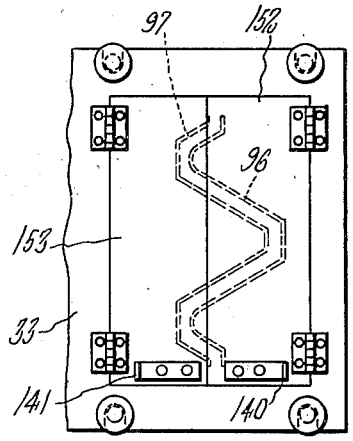
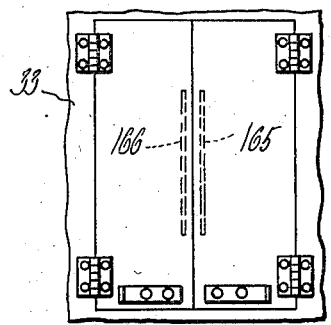
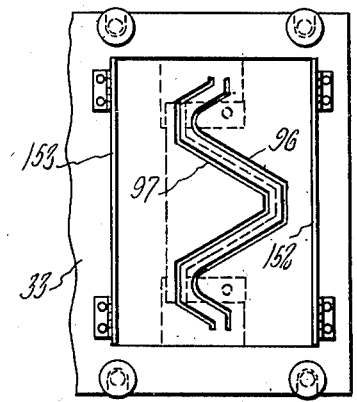
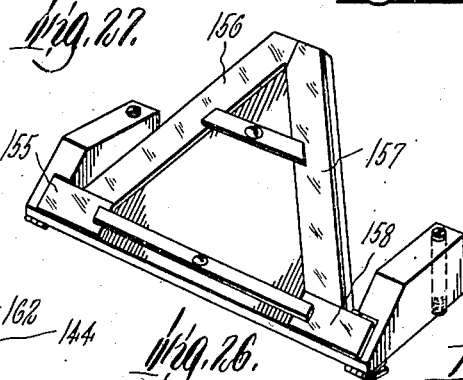
Inventor
Clarence R. Ranney
by Wright, Brown, Quinby & May
Attys.

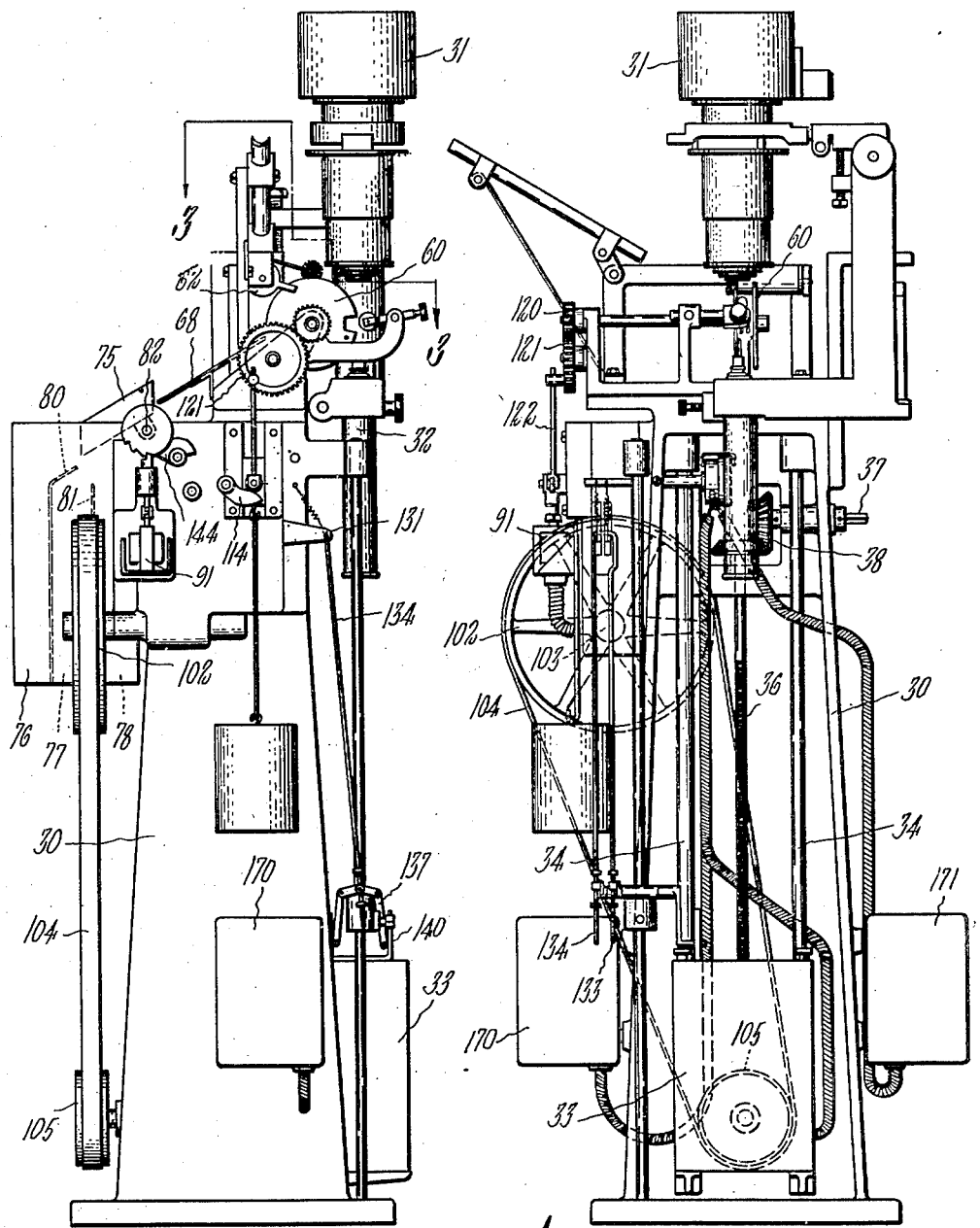

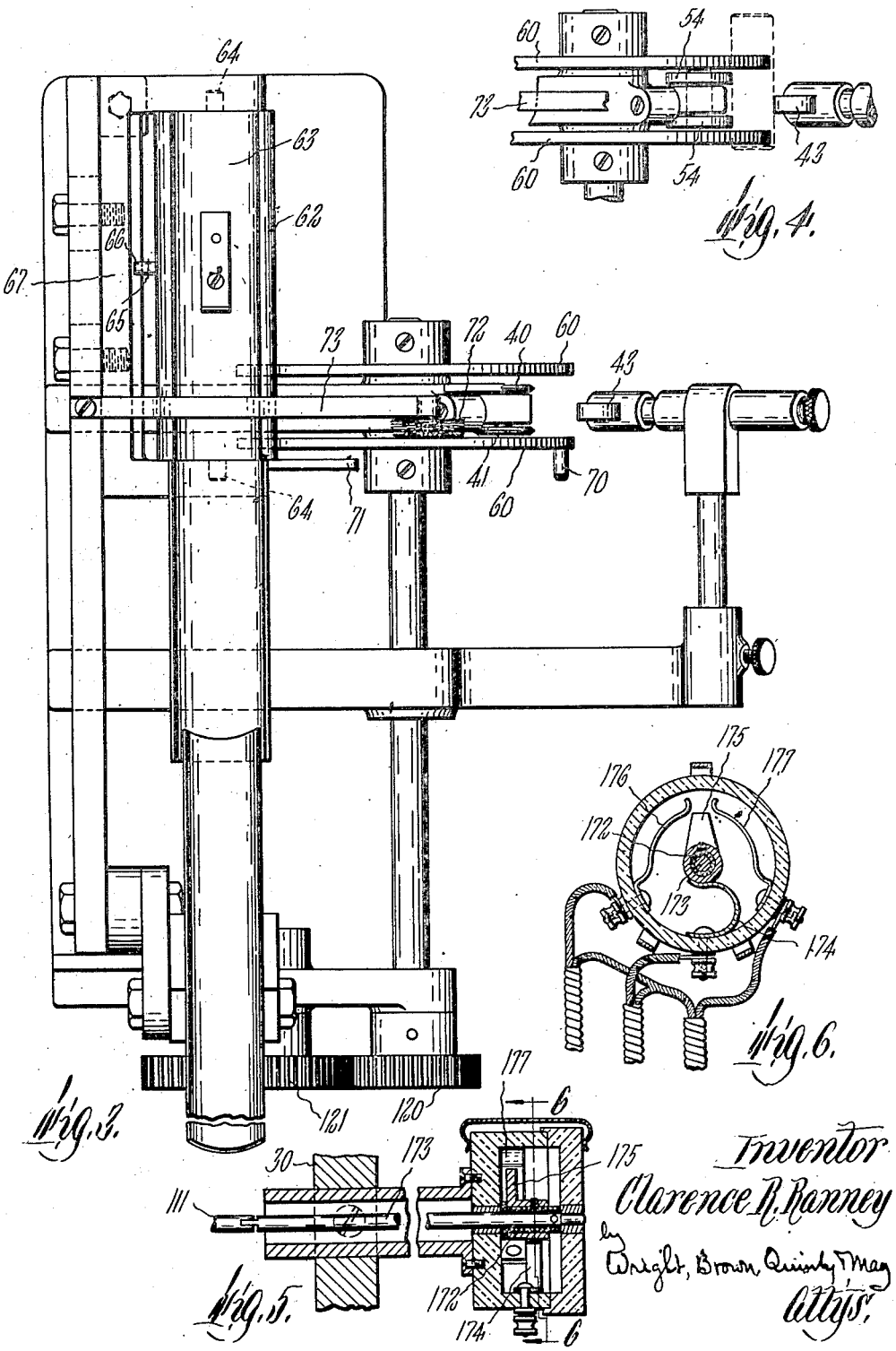

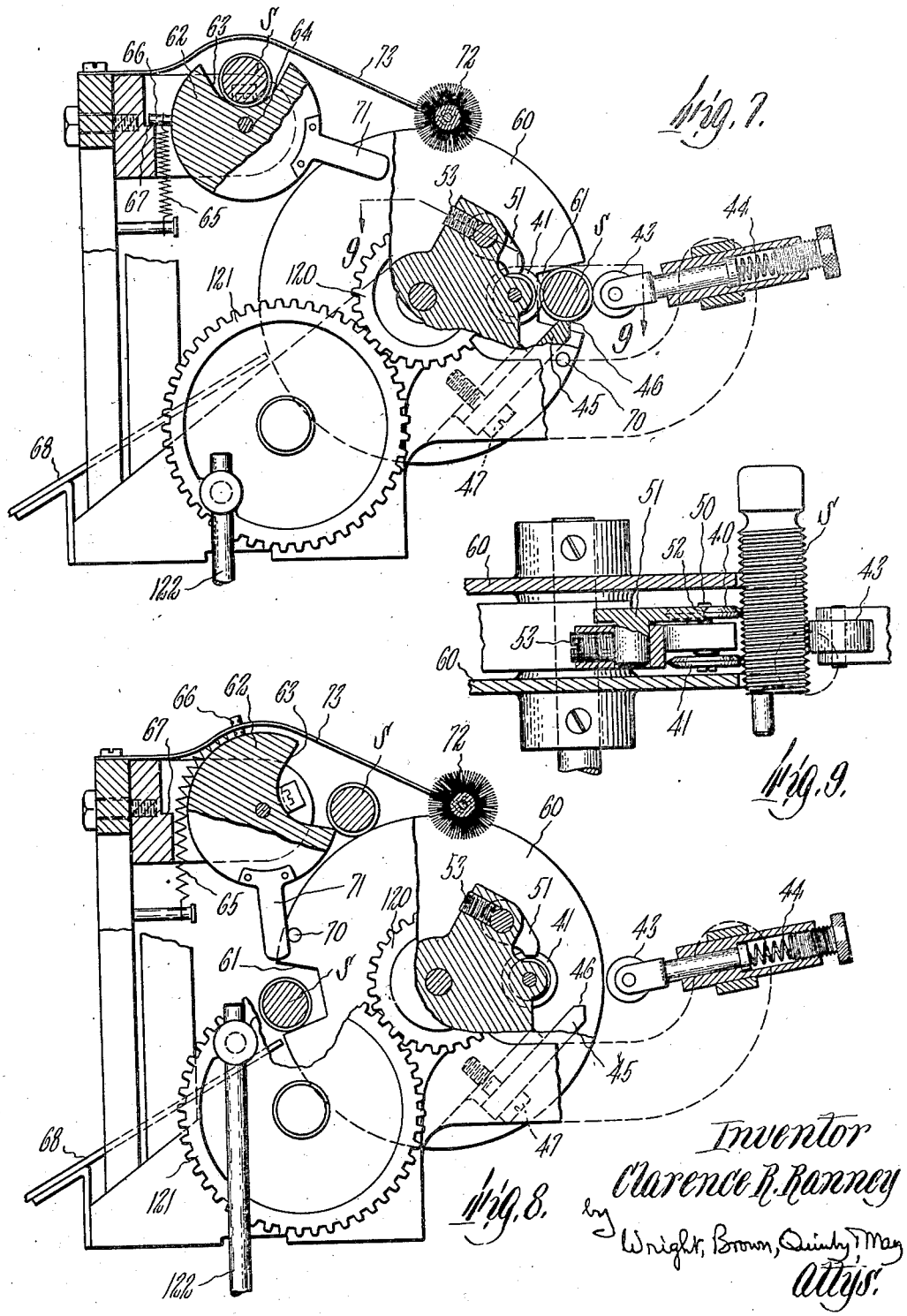

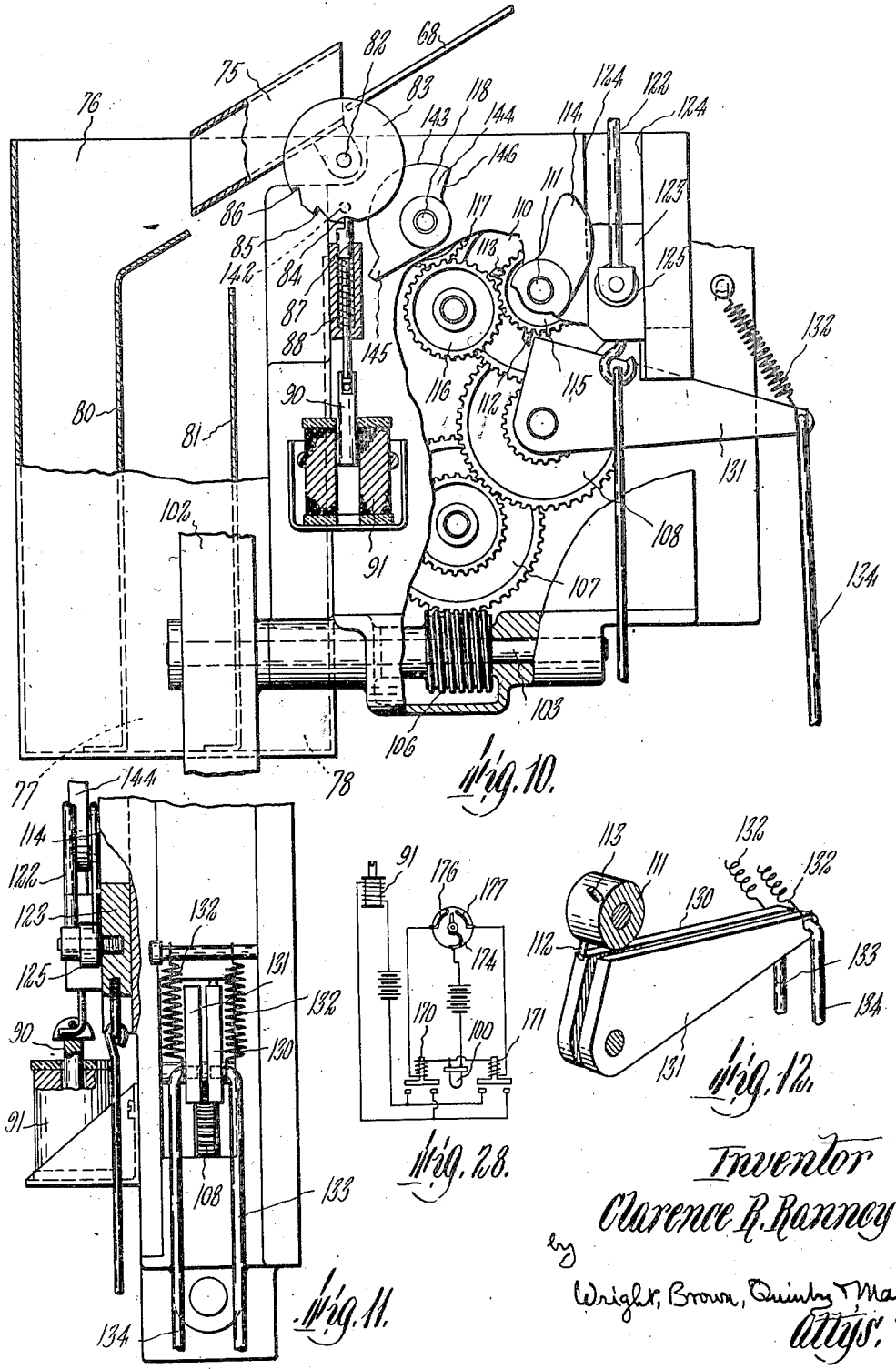

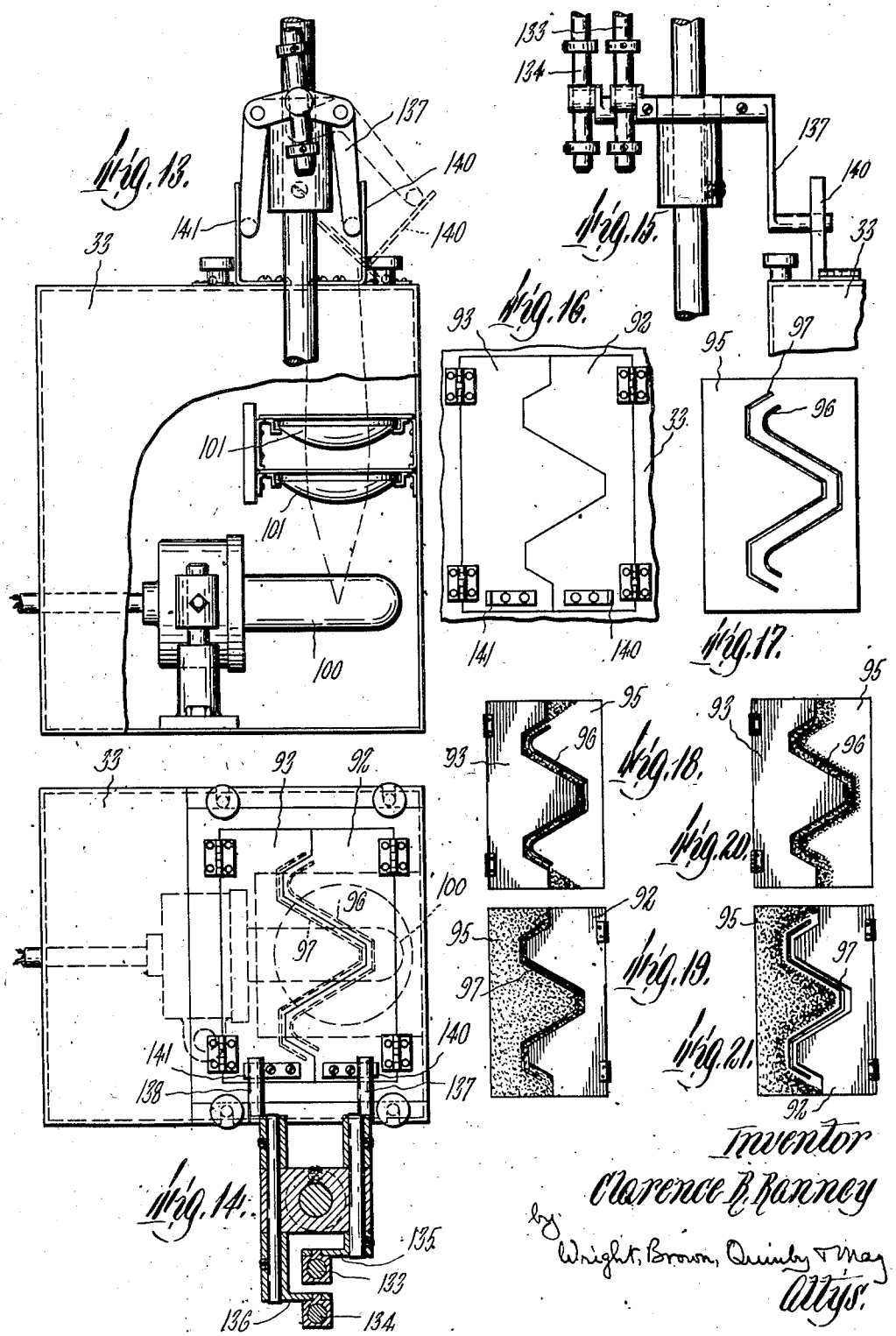

Patented Oct. 30, 1934

1,979,079

UNITED STATES PATENT OFFICE 1,979,079

SORTING APPARATUS

Clarence R. Ranney, Springfield, Vt., assignor to Jones & Lamson Machine Company, Springfield, Vt., a corporation of Vermont Application June 20, 1931, Serial No. 545,666

13 Claims. (Cl. 209—111)

This invention relates to apparatus for automatically gaging and sorting a series of similar articles which should be of uniform size, or more particularly should have a certain dimension within specified limits of tolerance. The apparatus hereinafter described may be adapted for use with articles of any one of a number of different shapes and kinds, it being necessary to adjust the apparatus to the particular kind and size of article to be gaged. In the embodiment of the invention illustrated on the drawings and hereinafter described, the apparatus is designed for the sorting of screw threaded elements such as bolts or screws.

Generally speaking, the apparatus comprises mechanism for receiving a series of similar objects to be gaged, a suitable carriage which holds these objects one at a time in position for gaging, mechanism for discharging each object after test, and means for controlling the discharge mechanism in such a way that the object gaged is selectively directed into one of a number of bins or receptacles according as the measured or tested characteristic of the object is within the defined limits of tolerance, is above the maximum, or is below the minimum limit. Thus in the particular embodiment of the invention herein described and illustrated the apparatus includes three bins for oversize, correct and under size bolts or screws. As each bolt is received by the apparatus, it is transferred to the carriage on which it is located for gaging. A discharge guide is automatically adjusted in accordance with the characteristics of the screw thread, and the discharging apparatus then removes the bolt from its testing carriage and transfers it to the adjusted guide through which it is discharged into the appropriate bin. While various means may be used for the automatic adjustment of the discharge guiding means, the embodiment herein illustrated and described includes electromagnetic control means operating through a photo-electric cell which is activated by a beam of light projected past a certain portion of the periphery of the screw which is being gaged, so that the position and character of the shadow outline cast by the portion of the screw in line with the beam of light determines the adjustment of the discharge guide through which the screw is thereupon discharged.

For a more complete understanding of the invention, reference may be had to the description thereof which follows and to the drawings, of which,—

Figure 1 is a side elevation of apparatus embodying the invention.

Figure 2 is an end elevation of the same.

Figure 3 is a plan view of a portion of the apparatus by which screws to be gaged are supplied to the testing carriage, this view being taken on the line 3—3 of Figure 1.

Figure 4 is a fragmentary plan view of a modified form of a portion of the apparatus shown in Figure 3.

Figure 5 is a longitudinal section of a commutator shown in Figure 2.

Figure 6 is a section on the line 6—6 of Figure 5.

Figure 7 is a side elevation of a portion of the mechanism for transferring screws to and from the testing carriage, portions being broken away.

Figure 8 is similar to Figure 7, the parts being shown in a different position of operation.

Figure 9 is a section on the line 9—9 of Figure 7.

Figure 10 is a side elevation of mechanism for operating certain portions of the apparatus.

Figure 11 is an end elevation of the mechanism shown in Figure 10.

Figure 12 is a perspective view of a portion of the shutter operating mechanism.

Figure 13 is a side elevation of the cabinet containing the photo-electric cell, a portion of the housing being broken away to show the members within.

Figure 14 is a plan view of the same.

Figure 15 is a fragmentary front elevation of a portion of the mechanism shown in Figure 14.

Figure 16 is a plan view of the shutters which cover the screen.

Figure 17 is a plan view of the screen underlying the shutters.

Figures 18, 19, 20 and 21 are plan views of the partially exposed screen under various conditions of operation.

Figure 22 is a side elevation of the photo-electric cabinet, a side wall having been omitted to show a modified arrangement of parts within.

Figure 23 is an elevation, partly in section, of controlling means for the discharge guide adapted to operate with the photo-electric set up illustrated in Figure 22.

Figure 24 is a plan view of shutters for the cabinet shown in Figure 22.

Figure 25 is a similar plan view showing the shutters in their open position.

Figure 26 is a perspective view of a mirror illustrated in Figure 22.

Figure 27 is similar to Figure 24, but indicates a screen adapted for testing a different type of object.

Figure 28 (Sheet 4) is a wiring diagram showing the photo-electric cell connected to the actuating magnet through a pair of relays.

The apparatus as a whole, as indicated in Figures 1 and 2, may be mounted on a suitable substantial standard 30. Briefly the apparatus consists of a suitable carriage for holding a screw or other member to be gaged firmly in position for test, an optical system by which a beam of light is projected past a portion of the periphery of an object so held, a screen upon which a magnified shadow outline of the portion of the object falls, apparatus for automatically placing the screws successively in position on the carriage and for removing the screws from the carriage after being gaged, an adjustable guide to direct the screws after test into one or another of a series of bins, and a photo-electric mechanism responsive to the shadow image cast on the screen for controlling the setting of the discharge guide immediately prior to the operation of the means for removing the gaged screw from the carriage.

The optical portion of the apparatus may be similar in principle and general construction to that described and illustrated in the patent to Hartness No. 1,480,390 or the patent to Hartness et al No. 1,703,933. As shown, it may consist of a suitable cabinet 31 containing an electric lamp or other suitable source of light. The cabinet also preferably contains a condensing lens (not shown) by which a beam of parallel rays of light may be projected downwardly past a portion of the periphery of a screw which is held in place for gaging. The shadow of this portion of the screw falls on a magnifying unit indicated at 32 which is adjusted so that a sharp magnified shadow image of this portion of the screw is cast on the top of a photo-electric cabinet 33 mounted at the lower portion of the standard 30. This photo-electric cabinet, as indicated in Figure 2, may be mounted to slide on a pair of rods 34 for vertical adjustment, such adjustment being accomplished as by a screw 36 which cooperates with a corresponding threaded portion of the casing 33, so that when the screw 36 is rotated by turning a convenient shaft 37 connected to the screw 36 as by a pair of miter gears 38, the cabinet 33 may be raised and lowered. In this way the degree of magnification of the shadow image may be accordingly regulated.

The carriage which holds the screw to be gaged may be of any suitable type, such, for example, as is illustrated and described in the patent to Beardsley No. 1,715,813. A carriage of this type may include a pair of coaxially spaced disks 40 and 41, these disks preferably having V-peripheries with beveled surfaces meeting at an angle of substantially sixty degrees so as to fit snugly into the valleys of a standard screw thread. Opposite these disks is a presser foot 43 which is pressed toward the disks 40 and 41 as by a suitable spring 44. This presser foot may be in the form of a roller, as indicated in Figures 7 to 9. A stop 45 is also provided consisting of a plate presenting an edge 46 of substantial width to the side of a screw which is inserted in the carriage. The stop 45 may be adjusted as by suitable set-screws 47, so that when a screw is pushed into the position between the disks 40, 41 and the presser foot 43, it will rest against the stop 45 when its central axis is just past the line of centers of the disks 40, 41 and the presser foot 43. The spring 44 thereupon holds the screw S firmly in place for gaging. The disks 40 and 41 are preferably mounted loosely on a common arbor 50 so as to turn freely thereon and also to be free to move a limited distance axially thereon. The axial position of the disk 40, however, is adjustably fixed as by a fork 51 which has a notched end 52 fitting closely on a portion of the periphery of the disk 40. The axial position of the fork 51 may be fixed as by a suitable set-screw 53 so that the disk 40 is thereupon held firmly against any axial displacement. The disk 41, however, is left free for a small axial displacement so as to accommodate itself to enter a valley of a screw thread in which lead error may be present. Such lead error would change the normal spacing between the disks 40 and 41 when they enter spaced turns of a screw thread. The disk 40 determines a definite point of reference for each screw by locating one of the turns of the screw thread in a definite axial position with reference to the beam of light. The latter is axially spaced from the disk 40, as indicated by the dotted circle in Figure 9, the beam of light being preferably approximately opposite the disk 41 so that in case there is lead error present in the screw under test, such error will manifest itself by an axial displacement of the shadow outline of the turn of the thread in line with the beam.

If objects other than screw threaded screws or bolts are to be tested, the parts of the carriage may be accordingly modified to receive such objects. For example, as shown in Figure 4, if it is desired to test the accuracy of the diameter of a series of cylindrical objects, the disks 40 and 41 may be replaced by disks 54 having cylindrical edges instead of V-edges.

In Figures 7 and 8, automatically operable mechanism is illustrated for transferring successive screws to the testing cradle and for discharging tested screws therefrom. As shown, this mechanism may comprise a pair of parallel transfer disks 60, each of these disks being notched as at 61 to receive a screw S within its periphery. Suitably located with reference to the disks 60 is a cradle 62 having a trough 63 therein adapted to hold a screw. This cradle may be constructed in any convenient way such as by forming the trough 63 in a side of a solid cylindrical member which may be pivotally supported by suitable pivots 64 in line with its central axis. Thus, the bulk of the weight of the cradle 62 being below the horizontal axis of rotation, the cradle tends to remain upright with the trough 63 uppermost. To insure this normal position more positively, I may employ a suitable spring 65 attached to a pin 66 on the periphery of the cylinder 62, the pin 66 being adapted to bring up against a suitable shoulder or stop 67 when the trough 63 is uppermost. The transfer disks 60 are mounted for rocking motion about their common axis from the position shown in Figure 7 to the position shown in Figure 8. The rocking motion toward the left results in a transfer of a screw which has been tested, as in Figure 7, to the discharge position shown in Figure 8, where the screw is permitted to roll under gravity onto a discharge slide 68. The latter part of this rocking motion toward the left brings a pin 70, which is mounted on one of the disks 60, into engagement with a radial arm 71 extending from the cylinder 62. This causes the cylinder to rock toward the right, as shown in Figure 8, thus depositing another screw S on the peripheries of the disks 60. When the disks are thereafter rocked toward the right, this screw soon falls into the notch 61 and is thereupon carried around to the position illustrated in Figure 7, the sides of the notches 61 pressing the screw firmly into testing position against the stop 45. In order to clean the portion of the thread which is to be in line with the beam of light, so as to present a sharp outline, a suitable stiff brush 72 may be mounted in the path of the screw between the cylinder 62 and the carriage, so that any dirt adhering in the thread valleys which are in line with the beam of light is effectively removed. The brush may be conveniently supported as by a strip of spring material 73.

As indicated in Figures 1 and 10, the discharged screws which slide down the inclined platform 68 pass through a movable chute 75 which is adjustable to direct them selectively into any one of three bins. As shown, the outer bin 76 is adapted to receive over size screws, the middle bin 77 is adapted to receive screws having threads within the limits of tolerance, and a third bin 78 is adapted to receive under size screws. These bins are separated by suitable partitions 80 and 81. The guiding chute 75 may be mounted for adjustive movement about an axis 82. On this same axis a disk 83 is mounted for rotative movement with the chute 75. This disk is preferably notched, as at 84, 85 and 86, a suitable pawl 87, in the form of a plunger, being pressed as by a spring 88, against the periphery of the disk 83, so that it is adapted to enter any of the notches therein and to hold the disk in adjusted position. As shown in Figure 10, the chute 75 is laterally offset from the axis 82 so that if left to itself it tends to rotate in a counter clockwise direction under the influence of gravity. The pawl 87, when in any one of the notches of the disk 83, holds the chute and disk against such rotative movement. The notches are so positioned that when the pawl is engaged in the notch 84, the chute 75 is in line with the bin 76 for over size screws. When the pawl 87 is engaged in the notch 85 the chute 75 registers with the bin 77 for correct screws. When the pawl 87 is engaged in the notch 86, the chute 75 registers with the bin 78 for under size screws. The pawl 87 may be connected with the armature 90 of an electromagnet so that the energization of the magnet results in the retraction of the pawl 87 against the spring 88. This permits the chute 75 and disk 83 to rotate in a counterclockwise direction.

The magnet 91 is controlled by photo-electric apparatus, as hereinafter described in more detail. When a screw is on the carriage in position for testing, a portion of its thread is in line with a beam of parallel rays of light projected downwardly from the cabinet 31. The shadow image cast by the portion of the screw in line with the beam is magnified by the magnifying unit 32, a sharp magnified shadow being cast upon the top of the cabinet 33 which contains the photo-electric control apparatus. The top of the cabinet 33 is provided with a suitable aperture normally closed by a pair of shutters 92 and 93. These shutters normally overlie and cover a screen 95 which fills the aperture in the top of the cabinet 33. The screen 95 is preferably opaque except for a pair of transparent lines 96, 97. A suitable screen may conveniently be made by tracing the lines 96 and 97 in black ink on a thin sheet of paper, placing a sensitized photographic plate under the tracing, exposing the plate to light, and then developing until the field of the plate is densely black, the narrow areas or lines 96 and 97 which were protected by the ink being left transparent. As shown in Figure 17, the transparent lines 96 and 97 may be in the shape of a contour outline of a single turn of screw thread and spaced from each other so as to indicate the positions of the shadow images cast by the single thread when the thread is respectively of minimum and maximum tolerable pitch diameter. Thus a screw having a thread with maximum pitch diameter would cast a shadow coinciding with the narrow transparent line 96. A thread with minimum tolerable pitch diameter would cast a shadow outline coinciding with the transparent line 97. In both cases it is assumed that the threads are free from lead error.

In setting up the apparatus for use, the position of the cabinet 33 and the adjustment of the magnifying unit 32 are so regulated that a single turn of the thread past which the beam of light is projected causes a shadow image on the same scale as that used for laying out the lines 96 and 97. As indicated in Figure 16, the shutters 92 and 93 have edges which fit against each other when the shutters are closed. These edges have contours such as bring them between the lines 96 and 97, so that when the shutter 92 is opened the transparent line 96 is exposed throughout its entire length, the line 97 remaining entirely covered. When the shutter 93 is opened, the line 97 is in like manner exposed. In the operation of the apparatus, the shutters 92 and 93 are alternately opened so as to expose the lines 96 and 97 one at a time. The position of the shadow cast by the turn of thread in line with the beam of light determines whether light will enter the cabinet 33 through either or both of the lines 96 and 97 when they are successively exposed. In the average shop there is insufficient stray light to interfere with the proper operation of the photo-electric cell. If the apparatus should be set up in a brightly lighted position, a black curtain (not shown) may easily be hung around the lower end of the magnifying unit 32 to hang below the top of the cabinet 33.

In Figure 13 a portion of the wall of the cabinet 33 is broken away to show an arrangement of elements within. A photo-electric cell 100 is conveniently mounted in the lower portion of the cabinet. Above the sensitive portion of this cell, one or more suitable condensing lenses 101 may be mounted to collect the light passing through either of the lines 96 and 97 and to focus such light on the sensitive portion of the cell 100. The electromagnet 91 is connected to the cell in such a way, after a manner well known in the art, that when light falls upon the cell 100, the electromagnet 91 is energized sufficiently to retract the pawl 87, thus releasing the disk 83 and the chute 75. The operation of these parts is more completely hereinafter described.

For the synchronized actuation of the screw-transferring means, the discharge chute, and the shutters, suitable mechanism, illustrated particularly in Figures 1, 7 and 10, is provided. A pulley 102 may be mounted on a suitable drive shaft 103, this pulley being connected as by a power belt 104 to any suitable source of power. An electric motor (not shown) may be conveniently mounted within the base of the apparatus, a pulley 105 being mounted on the motor shaft to drive the belt 104. As shown in Figure 10, the shaft 103 may carry a worm 106 meshing with a worm gear 107 which is connected through an idle gear 108 to a gear wheel 110. The latter, as shown, is mounted on a shaft 111 which carries a pair of spaced pins 112 and 113, a cam member 114, and a pinion 115. The pinion 115 is connected through an idle gear 116 to a pinion 117 of the same size, the latter being mounted on a shaft 118. Thus the shafts 111 and 118 turn in the same direction and at the same speed.

For the actuation of the transfer disks 60, a pinion 120 is coaxially mounted with these disks to rotate therewith. The pinion 120 meshes with a gear wheel 121, near the periphery of which is mounted a connecting rod 122. This rod extends downwardly, the lower end being secured to a block 123 which slides between a pair of guides 124. Mounted on this block is a roller 125 which is engaged by the cam member 114 as the latter swings around its shaft 111, so that with each revolution of the cam member 114 the rod 122 is vertically reciprocated once in each direction. It is evident from Figures 7 and 8 that the upward movement of the rod 122 results in the rotation of the transfer disks 60 from the position shown in Figure 7 to the discharge position shown in Figure 8. Conversely the downward movement of the rod 122 results in the return of the disks 60 from the position shown in Figure 8 to that shown in Figure 7. In other words, the upward movement of the rod 122 discharges a tested screw, while the downward movement results in a transfer of a fresh screw into place on the carriage for testing. This downward movement of the rod 122 is preferably effected by gravitational means. Since the block 123 as shown may not of itself have sufficient weight for the effective operation of the rod 122, and hence of the disks 60, a suitable additional weight 126 may be suspended therefrom as by a link 127. This weight is preferably sufficient to ensure that each screw which is transferred to the cradle for gaging is pressed firmly against the fixed stop 45 so that it is held accurately in position. The subsequent operation of the disks 60 in the opposite direction to discharge the screw from the cradle after it has been gaged, is effected by the cam 114 acting against the gravitational pull of the weight 126. Immediately after a fresh screw is placed on the carriage for testing, the shutters 92 and 93 are opened in turn to expose the lines 96 and 97 in succession to the shadow outline of the screw which is in place on the carriage. For the actuation of these shutters, a pair of rocking members 130 and 131 are provided. These rocking members have portions respectively in the paths of motion of the pins 112 and 113 so that as the shaft 111 rotates the pin 112 engages and rocks and then releases the member 130. Thereafter the pin 113 engages, rocks and then releases the member 131. Each of these members is held in normal position as by a spring 132. From the ends of the members 130 and 131 respectively connecting rods 133 and 134 extend downwardly and terminate, respectively, in crank arms 135 and 136. These crank arms are respectively connected with other crank arms 137 and 138, the latter being adapted to engage and swing outwardly a pair of fingers 140 and 141 which project, respectively, from the shutters 92 and 93. Thus when the rocking member 130 is rocked, the rod 133 is moved downwardly, rocking the crank arms 135 and 137, as indicated in Figure 13. This rocking of the crank arm 137 kicks the finger 140 outwardly, opening the shutter 92 to expose the line 96 to the shadow image of the screw being tested. In like manner, when the rocking member 131 is rocked, the shutter 93 is kicked open and is held open until the rocking member 131 is released. The photo-electric cell 100 is electrically connected to the magnet 91 so that when light falls upon the cell, the magnet is energized to retract the pawl 87 so as to permit adjustive movement of the chute 75 under the influence of gravity. As shown in Figure 10, the chute is normally held in registry with the bin 76 for over size screws. In operating the apparatus, the shutter 92 is first opened to expose the line 96 which defines the maximum limit of tolerance. If the screw under test is so large that its shadow covers the line 96, as shown in Figure 20, no light falls on the photo-electric cell when the shutter 92 is opened, and the chute 75 remains in its normal position as illustrated in Figure 10. It is obvious that when the shutter 93 is thereafter opened, the line 97, which defines the minimum limit of tolerance, will likewise be covered by the shadow so that no actuation of the magnet will result. Hence, when the screw is thereupon discharged from the carriage, it will pass through the chute 75 into the bin 76 where it belongs.

If a screw of correct size is mounted on the carriage, the shadow outline will fall between the lines 96 and 97 so that when the shutter 92 is opened to expose line 96, light will pass through this line and will fall upon the photo-electric cell 100, resulting in the energization of the magnet 91 and the release of the chute 75, which is then allowed to swing through a limited arc approximately into registry with the bin 77. The downward swing of the chute may be temporarily limited, as by a suitable pin 142 which is mounted on the disk 83 in such a way as to engage a portion 143 of a cam member 144 which is mounted on the shaft 118. This stops the movement of the chute 75 before the notch 85 has passed the pawl 87. The closing of the shutter 92 thereupon shuts off the light from the photo-electric cell 100, deenergizing the magnet 91 and permitting the pawl to enter the notch 85 so as to hold the chute in registry with the bin 77. Thereafter the shutter 93 is opened exposing the line 97. Since the thread being tested is of correct pitch diameter, its shadow will fall on the line 97 so that the magnet will not be energized a second time. Hence, when the screw is discharged it falls into the bin 77 where it belongs.

In the case of an under size screw having a pitch diameter less than the minimum limit of tolerance, the shadow falls in such a way that the light falls on both lines 96 and 97 in succession as their respective shutters are opened. This results in two actuations of the pawl 87 so that when the screw is tested, the pawl 87 is resting in the notch 86 and the chute 75 is directed into the bin 78, into which bin the screw thereupon falls.

After each discharge of a screw from the carriage, it is necessary to restore the chute 75 to its normal position shown in Figure 10. To this end the cam member 144 is provided with a radially extending nose 145 adapted to engage the pin 142 on the disk 83 and to rock the disk in a clockwise direction back to the position shown in Figure 10. The notches 85 and 86 are so formed that the pawl 87 freely rides out of them when the disk is rotated in a clockwise direction, so that after the nose 145 has passed the pin 142, the pawl 87 is again engaged in the notch 84. As shown in Figure 10, the cam member 144 is cut away as at 146, the various parts of the mechanism being synchronized so that when the shutter 93 is raised for a second operation of the magnet 91, the high portion 143 of the cam 144 has passed the pin 142 leaving the disk free for further rocking in case the pawl 87 is retracted from the notch 85.

A modified form of a portion of the apparatus is illustrated in Figures 22 to 26. As shown in Figure 22, the cabinet 33 contains two photo-electric cells 150 and 151 instead of one as hereinbefore described. In this embodiment of the invention, the shutters 152 and 153 need not follow the contours of the lines 96 and 97, but may be simply rectangular shutters. These shutters are adapted to be opened simultaneously so as to expose both the lines 96 and 97 at once. To this end the pins 112 and 113 may be arranged to engage the rocking members 130 and 131 simultaneously. Beneath the screen is mounted a mirror 154, this mirror being shown in perspective in Figure 26. This mirror may conveniently be made up of four pieces 155, 156, 157 and 158, these pieces being arranged to intercept the light passing through the transparent line 97 and to reflect such light to the cell 151 through suitable condensing lenses 101. The light passing through the transparent line 96 passes just beyond the periphery of the mirror 154 and is collected by condensing lenses 101 to fall on the sensitive portion of the cell 150. Thus, if a screw is over size, neither cell is activated. A screw of correct dimensions activates the cell 150 but not the cell 151, whereas an under size screw activates both cells. Figure 23 illustrates controlling apparatus modified for cooperation with the two cells illustrated in Figure 22. As shown, a pair of pawls 160 and 161 are provided, these pawls conveniently engaging the periphery of the disk 83 at opposite sides. A pair of notches 162 and 163 are provided in the periphery of the disk for engagement with the pawl 160. A single notch 164 is provided for engagement by the pawl 161. When the chute 75 is in its normal position, the pawl 160 engages in the notch 162, the pawl 161 riding on the rim of the disk. If neither of the cells 150 or 151 is activated, neither of the pawls 160 or 161 is retracted, so that the chute 75 remains in registry with the bin 77 for over size screws. A screw of correct size results in the activation of the cell 150 only, this resulting in the retraction of the pawl 160 from the notch 162. The chute 75 thereupon swings downwardly until the pawl 161 engages in the notch 164, the chute 75 then being in registry with the bin 77 for correct screws. An under size screw causes the simultaneous activation of both cells 150 and 151 so that the pawls 160 and 161 are both simultaneously retracted. This permits the chute 75 to swing down into the position shown in Figure 23, that is, in registry with the bin for under size screws. After the discharge of the screw the cam member 144 restores the disk 83 and the chute 75 to their normal positions as hereinbefore described.

While the mechanism thus far described is particularly intended for use in sorting screw threaded objects, such as bolts, screws and the like, with respect to the accuracy of pitch diameter of such screws, the apparatus can readily be adapted for use in gaging other articles which are supposed to have some dimension within specified limits of tolerance. For example, cylinders or other objects of definite geometric shape may be thus gaged. Figures 4 and 27 illustrate slight modifications in the apparatus which would serve to adapt it for use in gaging diameters of cylinders. Figure 27 indicates parallel transparent lines 165 and 166 which are adapted to indicate the limiting positions of a shadow cast by a cylinder having a diameter within the limits of tolerance. It is obvious that other shapes can also be gaged, the transparent lines being formed to correspond to the outline past which the beam of light is projected.

In the apparatus thus far described, no provision has been made for the gaging of screw threads having a lead error. Since one of the turns of thread of each screw gaged is held in a definite axial position by the disk 40 to serve as a point of reference, the effect of lead error on the shadow cast on the screen will be to displace the shadow in a direction parallel to the axis of the screw. Referring to Figure 17, which shows a screen for gaging screw threads, the shadow outline of the thread of a screw having a lead error would be displaced upwardly or downwardly according to the nature of the error. Thus a screw with an over size pitch diameter might also have so much lead error that the shadow of the turn of thread which would otherwise cover both transparent lines 96 and 97 would be upwardly or downwardly displaced, if shown on Figure 17, so that portions of one or both of the transparent lines might be exposed to the light. In such case, a screw thread having excessive pitch diameter and also having a lead error might be discharged into the bin for correct screws or even into that for under size screws, if the photo-electric cell is sensitive to any light coming in through either transparent line. In order to avoid such possible consequence, I may connect the photo-electric cell 100 to the electromagnet 91 through a pair of relays 170, 171, these relays being separately and successively connected in a circuit with the cell 100 when the two shutters 92 and 93 are opened. For the proper operation of the apparatus, it is desirable that the electromagnet 91 fail to function unless the transparent line 96 be exposed to light throughout its entire extent when the shutter 92 is opened. Thus if the screw which is being tested is of sufficiently large pitch diameter or has sufficient lead error to cause the shadow of its thread to overlap any substantial portion of the line 96, the electromagnet 91 will not operate. This result may be obtained by suitable adjustment of the relay 170 through which the magnet 91 may be operated when the transparent line 96 is exposed. On the other hand, it is desirable that a relatively small percentage of exposure of the line 97 result in the actuation of the magnet 91. To this end, the relay 171 may be adjusted so that light passing through any given fraction, such as ten or fifteen per cent, of the transparent line 97, will activate the cell 100 sufficiently to operate the relay 171 and consequently to energize the magnet 91. Thus if a screw thread, by reason of lead error, covers a portion of the line 97 with its shadow, the remaining exposed portion is sufficient to cause the activation of the electromagnet 91 so as to direct the screw into the bin 78 for screws of under size pitch diameter.

A suitable commutator, illustrated in Figures 5 and 6, may be provided to synchronize with the other portions of the apparatus and to connect the cell 100 alternately with the relays 170 and 171 at the proper times. To this end the commutator may be provided with a rotating member 172 mounted on an extension 173 of the shaft 111. As shown in Figure 6, the connecting member 172 may be provided with a hub portion in constant contact with a spring terminal 174, a radially projecting finger 175 extending from this hub member to engage successively a pair of arcuate contact elements 176 and 177 with a wiping contact. Thus as the shaft 173 rotates with the shaft 111, the finger 175 swings around and is in contact with the element 176 through a considerable arc of its swing, then with the element 177 throughout a considerable arc of its swing. As is evident from Figure 28, the cell 100 is alternately connected in a circuit with the relay 170 and the relay 171. The angular relation of the finger 172 to the shaft 111 is adjusted so that the finger 175 is in contact with the element 176 when the shutter 92 is opened and closes, and is in contact with the element 177 when the shutter 93 is opened and closes. Thus when the transparent line 96 is exposed, the cell 100 is in closed circuit with the relay 170, and when the transparent line 97 is exposed the relay 171 is in a closed circuit with the cell 100. Thus, by suitably adjusting the relays 170 and 171, they can be made responsive to different quantities of light falling upon the cell 100, so that a faulty operation of the apparatus arising from errors of lead in the screw thread can thus be avoided.

I claim:

1. Apparatus of the class described comprising means for holding an object in position for gaging, a supply trough rockable on a longitudinal axis, means for transferring successive objects from said trough to said holding means, said transferring means including a member mounted to rock on a longitudinal axis and having a lateral notch to receive an object for transfer, means for periodically rocking said member between supplying and discharging positions, and means on said trough and transferring means engageable to tilt said trough when said transferring means is rocked to its discharging position.

2. Apparatus of the class described comprising a supply chute, a discharge chute, a cradle for holding an object having a dimension to be gaged, transfer means movable in one direction to transfer an object from said cradle to said discharge chute, and movable in the opposite direction to transfer an object from the supply chute to the cradle, said discharge chute having a movable portion adapted to guide the discharged objects selectively in various directions, actuating means for reciprocating said transfer means to transfer a gaged object from the cradle to the discharge chute and to transfer another object from the supply chute to the cradle, and automatically controlled means operating between successive actuations of said transfer means to adjust the movable portion of the discharge chute in accordance with the gaged dimension of the object in the cradle.

3. Apparatus for sorting screws according to pitch diameters, comprising means for holding a screw in position for test, means for projecting a beam of light tangent to a turn of thread on said screw, a screen having an opaque field and a pair of translucent lines defining limits of tolerance, means for focusing said beam on said screen whereby the turn of thread in the path thereof casts a sharp shadow on said screen, means for disposing of each tested screw according to its pitch diameter, and means including a photo-electric cell behind said screen for controlling said disposing means.

4. Apparatus of the class described comprising a cradle for holding an object to be gaged, means for projecting a beam of light past a portion of an object held by said cradle, a screen, optical means for directing said beam of light to cast a shadow image of said portion of the object on said screen, said screen being opaque except for a pair of narrow translucent lines defining the maximum and minimum limits of tolerance for the outline of said shadow, a photo-electric cell aligned with said lines and on the side of the screen remote from said object, and means controlled by said cell for sorting the objects discharged from said cradle according to the location of said shadow outline.

5. Apparatus of the class described comprising a cradle adapted to hold a screw to be gaged, transfer means for depositing a screw in place on said cradle and for subsequently removing the screw from the cradle, a chute positioned to receive screws from said transfer means and movable to discharge screws in various selected directions, a screen, means for projecting a beam of light past a portion of a screw held on said cradle to cast a shadow on said screen, said screen having a pair of slits defining the limits of tolerance for the outline of said shadow, a photo-electric cell behind said screen in line with said slits, and means responsive to excitation of said cell for moving said chute to discharge each screw from the cradle in accordance with the shadow cast thereby.

6. Apparatus of the class described comprising a screen, means for casting on said screen a shadow outline of a portion of an object having a dimension to be gaged, said screen being opaque except for narrow slits defining the limits of tolerance for said outline, a pair of shutters respectively covering said slits, a photo-electric cell behind said shutters and screen, means for separately opening and closing said shutters to expose said slits successively, and means controlled by said photo-electric cell for disposing of said object according to the magnitude of the dimension gaged.

7. In apparatus of the class described, a substantially light-proof cabinet including a substantially opaque screen having a pair of narrow translucent lines in the form of enlarged shadow outline of a portion of an object to be gaged, said lines being spaced from each other to indicate the tolerable limits for the shadow outline cast by said object, light-sensitive means mounted in said cabinet in position to be acted upon by light entering the cabinet through said translucent lines, and means for intermittently casting shadow outlines on said screen.

8. Apparatus for sorting screws or the like, comprising means for holding a screw in position for gaging, means for projecting a beam of light tangent to a portion of said screw, a substantially opaque screen having a pair of narrow translucent lines or slits, optical means in the path of said beam for casting a sharp magnified shadow of said screw portion on said screen, a pair of shutters each normally covering one of said slits, means for moving said shutters successively to uncover momentarily their respective slits, a photo-electric cell behind said screen, three receptacles for screws, a guide chute normally registering with one of said receptacles and movable into registry with each of the other receptacles, means responsive to excitation of said photo-electric cell for controlling the movement of said chute into registry with successive receptacles, and means automatically operative after the discharge of a gaged screw through said chute to restore said chute to its normal position.

9. In apparatus of the class described, a substantially light-proof cabinet, one wall of which includes a substantially opaque screen having a pair of narrow translucent lines in the form of enlarged shadow outline of a portion of an object to be gaged, said lines being spaced from each other to indicate the tolerable limits for the shadow outline cast by said object, light-sensitive means mounted within said cabinet, and means for focusing on said light-sensitive means light entering said cabinet through either of said translucent lines.

10. Apparatus for gaging cylindrical objects, comprising a cradle for positioning said objects correctly for gaging, a supply member, oscillatable carriage means for transferring said objects one by one from said supply member to said cradle and in a reverse direction from said cradle to a discharge point, means yieldably urging said carriage means in the direction of movement from said supply member to said cradle, and power means actuable to move said carriage means in said opposite direction to discharge a gaged object carried thereby.

11. Apparatus for gaging elongated elements such as bolts or the like, comprising a rockable trough open at one end and of substantially the same length as one of said elements, a chute at said open end and adapted to guide elements axially into said trough, reciprocating means for receiving successive elements laterally from said trough and transferring each said element to and from the gaging station, and cooperating means carried by said trough and reciprocating means for rocking said trough during the stroke of said reciprocating means removing an element from the gaging station.

12. In a gaging apparatus, a discharge trough for gaged elements mounted to rock through a limited angle to vary the direction of discharge and constantly tending to move from a normal position at one limit of the rocking angle to the opposite limit of said angle, means periodically operating in a manner to restore said trough to normal position, and escapement means operable to release said trough for step-by-step rocking movement from its normal position.

13. In a gaging apparatus, a discharge trough for gaged elements mounted to rock on a horizontal axis through a limited angle to vary the direction of discharge from an uppermost position, said trough being arranged to tend toward its lowermost position by gravity, escapement means operable to release said trough by stages from the uppermost to the lowermost position, electromagnetic operating means for said escapement means, control means responsive to characteristics of the element being gaged to control said operating means, and means periodically operating in a manner to restore said trough to its uppermost position.

CLARENCE R. RANNEY.